H. H. BROWN.
Sad-Iron Heater.

No. 216,936.  Patented July 1, 1879.

WITNESSES
Saml R. Turner
C. M. Sites

INVENTOR
Harrison H. Brown
By R. S. & A. P. Lacey
ATTORNEYS.

UNITED STATES PATENT OFFICE.

HARRISON H. BROWN, OF LADOGA, WISCONSIN.

IMPROVEMENT IN SAD-IRON HEATERS.

Specification forming part of Letters Patent No. 216,936, dated July 1, 1879; application filed April 21, 1879.

*To all whom it may concern:*

Be it known that I, HARRISON H. BROWN, of Ladoga, in the county of Fond du Lac and State of Wisconsin, have invented certain new and useful Improvements in Sad-Iron Heaters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention consists in the peculiar manner of arranging the lever for lifting the lid of the heater, as will be hereinafter fully described, and pointed out in the claim.

Figure 1:
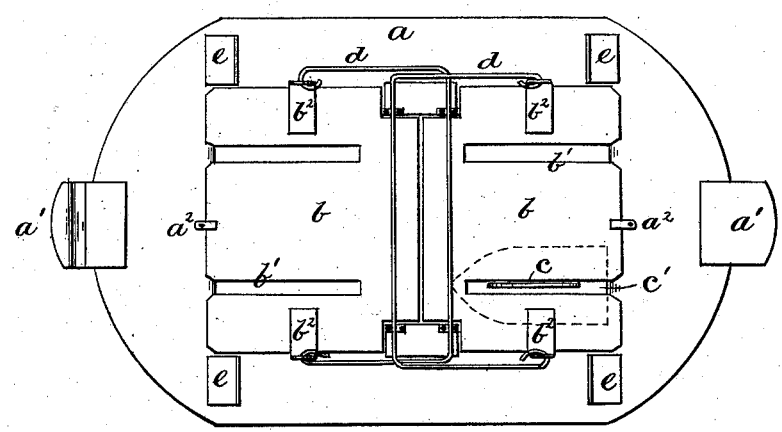
Figure 2:
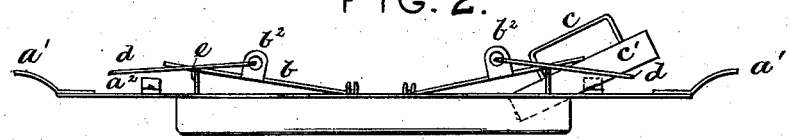
Figure 3:
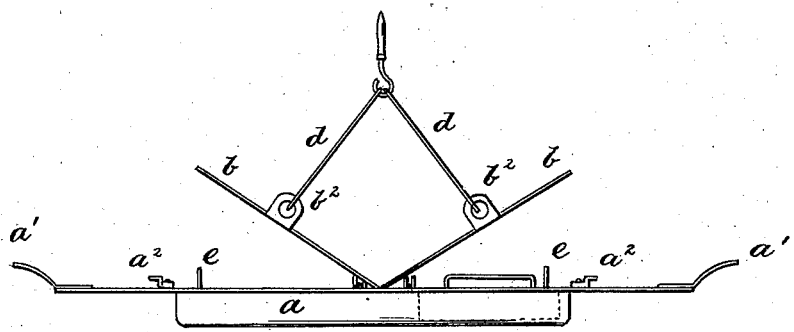

In the drawings, Figure 1 is a plan, and Figs. 2 and 3 are side elevations, of a heater constructed according to my invention.

$a$ is the heater, of ordinary form, and is provided with the lids $b$ $b$, hinged at or near the center, as shown. The lids are constructed with slots $b^1$, up through which the handle $c$ of the iron $c'$ projects, as shown. The lids are so hinged that they can be only partially raised, as shown in Fig. 3. Each lid is provided with ears $b^2$ on its sides, to which are attached the loops of the bail $d$. The bail, when the heater is in use, rests on fulcra $e$ fixed on the heater, and extends beyond the end of the lid, which, when lifted, rises inside the bail-arm.

By placing an iron in the bail opposite one of the slots $b$, the lid will be lifted and the iron can be slipped into the heater.

The handle enters one of the slots and projects above the lid, where it can be readily grasped. By lifting the iron the lid is lifted, which movement throws the bail down out of the way, and the iron can be drawn back over the bail and out of the heater.

It is very inconvenient to lift the ordinary heater by the ears $a^1$ $a^1$.

In my device the bails are so arranged that they are used for handling the heater. They can be caught by a hook or other suitable instrument, as shown in Fig. 3, and the heater lifted, when hot, to any desired place or for any desired purpose.

When not in use the irons can be placed in the heater, and the lids fastened down by the buttons $a^2$ $a^2$. The heater can then be carried by the bails.

The arrangement of the bails as described, so that they serve the double purposes set forth, renders my device much more serviceable than those of ordinary construction.

Having thus fully described my invention, what I claim is—

The heater $a$, having fulcra $e$, slotted lid $b$, provided with ears $b^2$ on its sides, and bail $d$, hinged to the ears $b^2$, all arranged to operate substantially as and for the purpose set forth.

In testimony that I claim the foregoing as my own I affix my signature in presence of two witnesses.

HARRISON H. BROWN.

Witnesses:
E. P. MEAD,
W. F. ROBBEY.